D. E. WERTS.
RULE.
APPLICATION FILED OCT. 2, 1909.
978,525.
Patented Dec. 13, 1910.
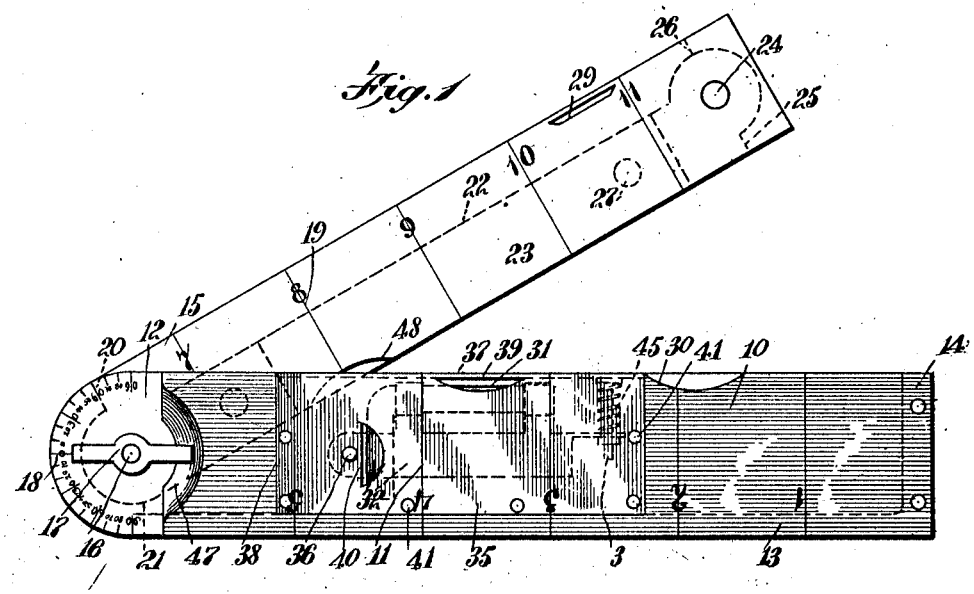
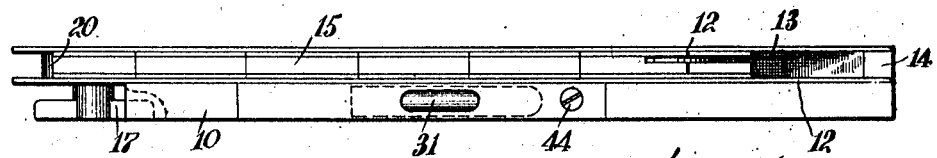
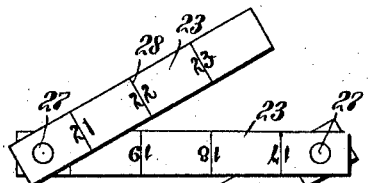
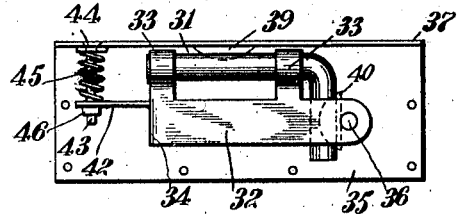
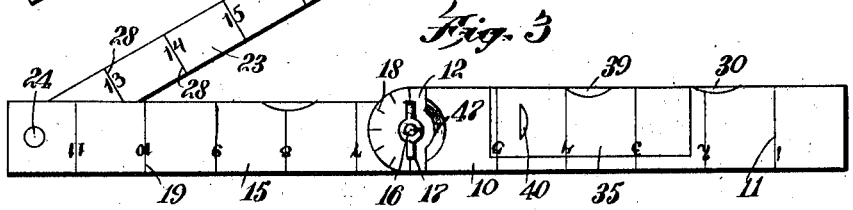
WITNESSES
INVENTOR
David E. Werts
BY
ATTORNEYS

UNITED STATES PATENT OFFICE.

DAVID ELMER WERTS, OF OLYMPIA, WASHINGTON.

RULE.

978,525.  Specification of Letters Patent.  Patented Dec. 13, 1910.

Application filed October 2, 1909. Serial No. 520,626.

*To all whom it may concern:*

Be it known that I, DAVID ELMER WERTS, a citizen of the United States, and a resident of Olympia, in the county of Thurston and State of Washington, have invented a new and Improved Rule, of which the following is a full, clear, and exact description.

This invention relates to rules which constitute combined squares, levels and bevels, and relates more particularly to a combination tool of this class which comprises a body, an arm having a pivotal connection with the body, means for clamping the arm in a plurality of angular positions relative to the body, and means for indicating the relative angularity of the body and the arm. The body if so desired, may be provided with a level.
The object of the invention is to provide a simple, strong and durable rule which can be used as a linear or other measuring device, which can be employed as a square, or as a bevel for determining angularities, and which can be folded into small and compact form.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 1 is a side elevation of an embodiment of my invention showing certain of the parts in dotted outline; Fig. 2 is a plan view of the rule showing the same folded;
Fig. 3 is a side elevation of the rule showing the parts extended; and Fig. 4 is a side elevation of a detail showing the level removed from the body of the rule.

Referring more particularly to the drawings I provide a rule body 10 fashioned from wood or other suitable material and having indicated thereon graduations 11. It will be understood that the rule body may be of any suitable length and may be graduated in accordance with individual preference and special conditions, though I prefer to make the body six inches long and to have it graduated in inches and their fractional parts. The body has associated therewith a part comprising spaced sides 12 and a back 13 therebetween, the back having at one extremity an end extension 14. The sides may consist of metal plates or the like and are extended at one end beyond the body, the extending member being rounded, as is shown most clearly in Figs. 1 and 3.

An arm 15 is pivotally mounted between the projecting ends of the sides, by means of a suitable pin 16 having a threaded laterally projecting end upon which is mounted a clamping wing nut 17. The latter serves to clamp the arm in any desired angular position with respect to the body. The projecting ends of the sides have graduations 18 indicating in degrees the relative angularity of the parts. This arrangement adapts the device for use as a bevel or as a square in the customary manner, for carpentry and like uses. The arm, which is preferably also six inches in length, when folded, is received between the sides 12, resting against the back. It is provided with suitable graduations 19 indicating inches and fractional parts thereof, or other measures. The arm is cut away at the pivoted end to form a shoulder 20 which abuts against the end 21 of the back 13 to limit the extension of the arm and to insure the alinement of the arm and the body when the arm is fully extended. The arm has a longitudinal recess 22 in which are located rule extensions 23. The first of these is pivotally mounted within the arm by means of a pin 24 and has a shoulder 25 adapted to abut against a corresponding shoulder 26 at the free end of the arm to limit its extension.

The successive rule sections are pivotally associated by means of pivot pins or rivets 27. The sections are provided with suitable graduations 28 and may be of any suitable number. I have shown for example, three sections, each four inches long, so that the total extended length of this type of rule is two feet.

The arm has a notch 29 for the insertion of a finger-nail to permit its manipulation, and the body has a corresponding edge recess 30 which permits the notch 29 to be reached.

The body, at the side remote from the arm is recessed to receive a level. This level comprises a level-glass or tube 31 of any suitable transparent material and bent at right angles. It is mounted upon a suitable glass carrier 32 by means of eyes 33 integral with the carrier to receive one of the glass arms. At the end, the carrier has a scale 34 in which the other arm of the glass rests. The carrier is pivoted upon a plate 35 by means of a suitable rivet or the like 36. The plate has one longitudinal edge 37 laterally disposed, and is mounted over the recess 38 provided for the purpose, in the body, so that the glass itself is located within the recess. The laterally disposed edge 37 is located at an edge of the body as is shown most clearly in Figs. 1 and 2. It will be understood that by providing a level glass bent at right angles as shown, a single glass can be used for leveling the rule in two directions, the bubble traveling from one arm of the glass to the other. The plate 35 has sight openings 39 and 40 which permit the bubble to be viewed. It is secured upon the body by means of screws or pins 41 or in any other suitable manner.

The carrier has an extension finger 42 having an opening to receive an adjusting pin 43. The latter has a screw-head 44 located in an opening of the laterally disposed edge 37 and carries a helical spring 45, and at the side of the finger remote from the spring, a nut 46. It will be seen that by turning the screw in one direction or the other, the carrier can be adjusted pivotally to regulate the level.

The body at the end adjacent to the clamping nut has a curved bevel or cutaway part 47 to permit the manipulation of the clamping nut. The arm has an edge recess 48 so that the rule extensions can be easily extended when folded within the arm.

Having thus described my invention, I claim as new, and desire to secure by Letters Patent:—

1. In a rule, a body having a recess, a plate covering said recess, a carrier pivotally mounted upon said plate, within said recess, said carrier having eyes, a level glass having arms at substantially right angles, one of said arms being mounted in said eyes of said carrier, an adjusting screw, said carrier having a finger controlled by said screw, said screw being operable from the outside of said plate, and a spring mounted upon said screw and engaging said finger to hold said carrier in a normal position, said plate having sight openings adjacent to said arms of said glass.

2. A rule, comprising a body, an arm pivotally associated therewith, means for clamping said arm in a plurality of positions, means for indicating the relative angularity of said body and said arm, means for leveling the rule, said body being recessed to receive said arm when the rule is folded, said arm having a recess, and successive pivotally-connected rule extensions, the first of said extensions being movably associated with said arm whereby said extensions are adapted to be folded into said recess of said arm, one only of said extensions being secured to said arm.

In testimony whereof I have signed my name to this specification in the presence of two subscribing witnesses.

DAVID ELMER WERTS.

Witnesses:
AGUSTIN GEORGE FRASER.
JAMES HUNT.